United States Patent
Chu et al.

(10) Patent No.: US 11,800,396 B2
(45) Date of Patent: Oct. 24, 2023

(54) METHOD AND APPARATUS FOR WIRELESS COMMUNICATIONS

(71) Applicant: NXP USA, Inc., Austin, TX (US)

(72) Inventors: Liwen Chu, San Ramon, AZ (US); Young Hoon Kwon, Laguna Niguel, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 22 days.

(21) Appl. No.: 17/381,151

(22) Filed: Jul. 20, 2021

(65) Prior Publication Data
US 2022/0022087 A1  Jan. 20, 2022

Related U.S. Application Data

(60) Provisional application No. 63/066,878, filed on Aug. 18, 2020, provisional application No. 63/060,226, filed on Aug. 3, 2020, provisional application No. 63/054,071, filed on Jul. 20, 2020.

(51) Int. Cl.
  *H04W 28/02* (2009.01)
  *H04W 52/02* (2009.01)

(52) U.S. Cl.
  CPC ... *H04W 28/0263* (2013.01); *H04W 28/0268* (2013.01); *H04W 52/0216* (2013.01)

(58) Field of Classification Search
  CPC ......... H04W 28/0263; H04W 28/0268; H04W 52/0216; H04W 76/15; H04W 36/00692; H04W 36/0027; Y02D 30/70
  See application file for complete search history.

(56) References Cited

U.S. PATENT DOCUMENTS

| | | | |
|---|---|---|---|
| 2017/0055300 A1* | 2/2017 | Pitchaiah | H04W 76/11 |
| 2017/0373804 A1* | 12/2017 | Han | H04L 67/62 |
| 2021/0037583 A1* | 2/2021 | Seok | H04W 76/15 |
| 2021/0377851 A1* | 12/2021 | Liu | H04W 52/0206 |
| 2021/0409979 A1* | 12/2021 | Wang | H04W 52/0258 |
| 2023/0013454 A1* | 1/2023 | Gan | H04W 84/12 |

OTHER PUBLICATIONS

Murti et al, "Multi link Operation with Enhanced Synchronous Channel Access in IEEE 802.11be Wireless LANs: Coexistence Issue and Solutions", MDPI, 2021 (Year: 2021).*
Bellalta et al, "Multi-link Operation in IEEE 802.11be WLANs", 2022 (Year: 2022).*
Patil, Abhishek et al. "MLO: Protocol for TID-to-link negotiation", IEEE 802.11-20/1044r0, https://mentor.ieee.org/802.11/dcn/20/11-20-1044-00-00be-mlo-tid-to-link-mapping-negotiation.pptx. Feb. 26, 2020, 15 pgs.
U.S. Appl. No. 17/183,206, "Method and Apparatus for Multi-Link Operations" filed Feb. 23, 2021, pages.

* cited by examiner

*Primary Examiner* — Omer S Mian

(57) ABSTRACT

Embodiments of a method and an apparatus for wireless communications are disclosed. In an embodiment, a method for wireless communications involves connecting, by a first multi-link device (MLD) to a second MLD via at least two links, mapping, by the first MLD, a Traffic Identifier (TID) to at least one of the two links associated with the first MLD and the second MLD, transmitting, by the first MLD to the second MLD, frames that correspond to the TID on at least one of the two links according to the mapping by the first MLD, and receiving, by the first MLD from the second MLD, subsequent frames on at least one of the two links according to the mapping by the first MLD.

20 Claims, 8 Drawing Sheets

METHOD AND APPARATUS FOR WIRELESS COMMUNICATIONS

CROSS-REFERENCE TO RELATED APPLICATIONS

This application is entitled to the benefit of U.S. Provisional Patent Application Ser. No. 63/054,071, filed on Jul. 20, 2020, and U.S. Provisional Patent Application Ser. No. 63/060,226, filed on Aug. 3, 2020, and U.S. Provisional Patent Application Ser. No. 63/066,878, filed on Aug. 18, 2020, each of which is incorporated by reference herein.

BACKGROUND

In wireless communications, wireless devices, e.g., access point (AP) multi-link devices (MLDs) or non-AP MLDs, e.g., STA multi-link devices (STA MLDs (non-AP MLDs)), can execute various wireless operations, such as coordinate some features or operations for devices in a multi-link operation via one or more links. As an example, frames that correspond to Traffic Identifiers (TIDs) may be exchanged between a first wireless device (e.g., AP MLD or STA MLD) and a second wireless device (e.g., AP MLD or STA MLD) to coordinate TID-to-Link Mapping. However, because such multi-link operations may allow a multi-link setup signaling exchange to be executed via one link and/or enable directional-based TID-to-Link Mapping, current MLDs may not easily support TID-to-Link Mapping in multi-link operations.

SUMMARY

Embodiments of a method and an apparatus for wireless communications are disclosed. In an embodiment, a method for wireless communications involves connecting, by a first multi-link device (MLD) to a second MLD via at least two links, mapping, by the first MLD, a Traffic Identifier (TID) to at least one of the two links associated with the first MLD and the second MLD, transmitting, by the first MLD to the second MLD, frames that correspond to the TID on at least one of the two links according to the mapping by the first MLD, and receiving, by the first MLD from the second MLD, subsequent frames on at least one of the two links according to the mapping by the first MLD.

In an embodiment, mapping the TID to at least one of the two links includes negotiating, by the first MLD, TID-to-Link Mapping with the second MLD, where negotiating the TID-to-Link Mapping with the second MLD includes transmitting, by the first MLD to the second MLD, a TID-to-Link Mapping Request frame that includes a request Token and requested TID-to-Link Mapping information, and receiving, by the first MLD from the second MLD, a TID-to-Link Mapping Response frame that includes a response Token and a negotiation result.

In an embodiment, the method involves matching the request Token of the TID-to-Link Mapping Request frame to the TID-to-Link Mapping Response frame transmitted by the second MLD.

In an embodiment, at least one of the TID-to-Link Mapping Request frame and the TID-to-Link Mapping Response frame includes a TID-to-Link Mapping element.

In an embodiment, the TID-to-Link Mapping element includes a TID-to-Link Mapping Information field with an up-link (UL) Link Bitmap subfield, a down-link (DL) Link Bitmap subfield, and corresponding TID Bitmap subfields for the UL Link Bitmap subfield and the DL Link Bitmap subfield.

In an embodiment, the negotiation result included in the TID-to-Link Mapping Response frame indicates that the TID-to-Link Mapping is accepted.

In an embodiment, the negotiation result included in the TID-to-Link Mapping Response frame indicates that the TID-to-Link Mapping is rejected and includes a rejection reason.

In an embodiment, the TID-to-Link Mapping Response frame that indicates that the TID-to-Link Mapping is rejected includes Suggested TID-to-Link Mapping information.

In an embodiment, mapping the TID to at least one of the two links includes the first MLD using a TID-to-Link Mapping teardown to resume default TID-to-Link Mapping.

In an embodiment, the default TID-to-Link Mapping is accepted when the first MLD uses the TID-to-Link Mapping teardown to resume the default TID-to-Link Mapping.

In an embodiment, mapping the TID to at least one of the two links includes transmitting, by the first MLD to the second MLD, a TID-to-Link Mapping Request frame that requests default TID-to-Link Mapping, and receiving, by the first MLD from the second MLD, a TID-to-Link Mapping Response frame that indicates that the default TID-to-Link Mapping is accepted.

In an embodiment, mapping the TID to at least one of the two links includes announcing, by the first MLD, TID-to-Link Mapping with the second MLD, where announcing the TID-to-Link Mapping with the second MLD includes transmitting, by the first MLD to the second MLD, a TID-to-Link Mapping Announcement frame, and receiving, by the first MLD from the second MLD, an indication of an announcement result.

In an embodiment, the second MLD is a non-Access Point (non-AP) MLD that supports restricted Target Wake Time (TWT) and the indication of the announcement result accepts the TID-to-Link Mapping at non-AP stations (STAs) of the non-AP MLD that support the announced TID-to-Link Mapping.

In an embodiment, the second MLD is a low latency non-AP MLD and the indication of the announcement result accepts the TID-to-Link Mapping where a first set of links is dedicated to a first set of traffic types.

In an embodiment, mapping the TID to at least one of the two links includes announcing, by the first MLD, TID-to-Link Mapping with the second MLD via a TID-to-Link Mapping Announcement frame, where the second MLD does not indicate acceptance of the TID-to-Link Mapping from the first MLD, negotiating, by the first MLD, the TID-to-Link Mapping with the second MLD that does not indicate acceptance of the TID-to-Link Mapping, where negotiating the TID-to-Link Mapping with the second MLD includes transmitting, by the first MLD to the second MLD, a TID-to-Link Mapping Request frame that includes a request Token and requested TID-to-Link Mapping information, and receiving, by the first MLD from the second MLD, a TID-to-Link Mapping Response frame that includes a response Token and a negotiation result.

In an embodiment, the TID-to-Link Mapping Announcement frame is a Beacon frame.

In an embodiment, the method involves performing link disablement by mapping the TID to at least one of the two links associated with the first MLD and the second MLD.

In an embodiment, link disablement via the TID-to-Link Mapping is performed by the first MLD by at least one of a TID-to-Link Mapping negotiation and a TID-to-Link Mapping announcement on links with at least one mapped TID, and where at least one of the TID-to-Link Mapping negotiation and the TID-to-Link Mapping announcement is accepted by the second MLD.

In an embodiment, the second MLD is a STA MLD and after a DL TID is mapped to a new link where TIDs have not been mapped, a STA of the STA MLD in the new link is in power save mode and in doze state after at least one of a map negotiation and a map indication.

An embodiment of a first MLD is also disclosed. The first MLD includes a processor configured to connect to a second MLD via at least two links, map a TID to at least one of the two links associated with the first MLD and the second MLD, transmit, to the second MLD, frames that correspond to the TID on at least one of the two links according to the mapping by the first MLD, and receive subsequent frames on at least one of the two links according to the mapping by the first MLD from the second MLD.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
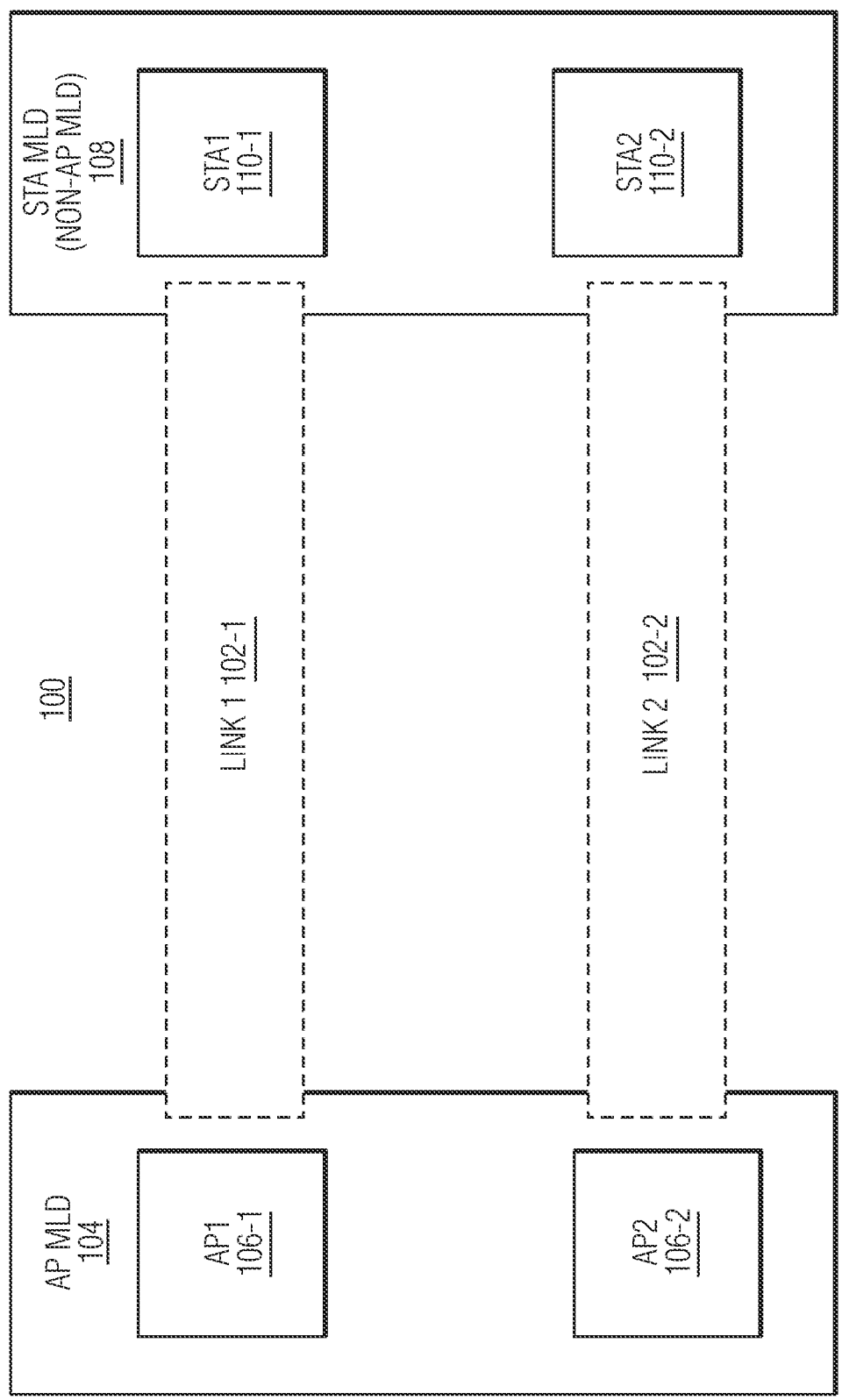
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) multi-link device (MLD) of a wireless local area network (WLAN) transmits data to at least one associated station (STA) MLD. The AP MLD is configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple STA MLDs, or multiple AP MLDs with more than one STA MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, implemented as APs 106-1 and 106-2. In such an embodiment, the APs may be AP1 106-1 and AP2 106-2. In some embodiments, a common part of the AP MLD 104 implements upper layer Media Access Control (MAC) functionalities (e.g., beacon acknowledgement establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a LAN) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 MHz BSS operating channel at 6 GHz band and AP2 106-2 may operate in a 160 MHz BSS operating channel at 5 GHz band. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD may be a communications device that wirelessly connects to a wireless AP MLD. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface.

In some embodiments, the AP MLD 104 and/or the STA MLD 108 may identify which communication links support multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link 1 102-1 and link 2 102-2. For example, each of the non-AP STAs 110-1 or 110-2 communicates with an AP 106-1 or 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz channels used to transmit frames (e.g., Physical Layer Convergence Protocol (PLCP) Protocol Data Units (PPDUs), beacons, management frames, etc.) between a first wireless device (e.g., an AP, an AP MLD, an STA, or an STA MLD) and a second wireless device (e.g., an AP, an AP MLD, an STA, or an STA MLD). In some embodiments, a 20 MHz channel may be a punctured 20 MHz channel or an unpunctured 20 MHz channel. Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicate) with the STA MLD 108 via more than two communication links or less than two communication links.

In some embodiments, a first MLD, e.g., an AP MLD or non-AP MLD (STA MLD), may coordinate Traffic Identifier (TID)-to-Link Mapping with a second MLD, e.g., STA MLD or AP MLD, via multi-link operations. As an example, TIDs may identify one, two, three, or more traffic classes for corresponding frames. In such an embodiment, the first MLD may be connected to (e.g., associated with) the second MLD, such that the first MLD and the second MLD may communicate (e.g., exchange frames) via communication links. According to the IEEE 802.11be protocol, such multi-link operations between the first MLD and the second MLD may allow a multi-link setup signaling exchange to be executed via at least one link and initiated by the second MLD (e.g., non-AP MLD). In addition, according to the IEEE 802.11be protocol, such multi-link operations between the first MLD and the second MLD may allow directional-based (e.g., up-link (UL) and/or down-link (DL)) TID-to-Link Mapping during the multi-link setup signaling exchange. Techniques for TID-to-Link Mapping for MLDs operating in accordance with the IEEE 802.11be protocol are described herein.

In accordance with an embodiment of the invention, a technique for wireless communications involves connecting, by a first MLD to a second MLD via at least two links, mapping, by the first MLD, a TID to at least one of the two links associated with the first MLD and the second MLD, transmitting, by the first MLD to the second MLD, frames that correspond to the TID on at least one of the two links according to the mapping by the first MLD, and receiving, by the first MLD from the second MLD, subsequent frames on at least one of the two links according to the mapping by the first MLD. In some embodiments, the first MLD may be an AP MLD (or an STA MLD) and the second MLD may be an STA MLD (or an AP MLD). In some embodiments, the first MLD and the second MLD may be switched, such that the second MLD may transmit frames that correspond to the TID on at least one of the two links and the first MLD may receive subsequent frames on at least one of the two links. Although the first MLD may be described as connecting to the second MLD via at least two links, the at least two links may be more than two links and may sometimes be referred to herein as "multiple links". Similarly, although the first MLD and the second MLD may be described as mapping, transmitting, and/or receiving frames on at least one of the two links, there may be more than two links (sometimes referred to herein as "at least one of the multiple links"). In some embodiments, transmitting the frames that correspond to the mapping by the first MLD may involve the mapping being a successful mapping negotiation initiated by the first MLD.

In some embodiments, an MLD (e.g., a first MLD and/or a second MLD) may connect to another MLD (e.g., a first MLD and/or a second MLD) via at least two links and may map a TID (or TIDs) to at least one of multiple links (e.g., two or more links) associated with the MLDs. In some embodiments, a first MLD, e.g., an AP MLD or non-AP MLD (STA MLD), may map the frames that correspond to the TID by negotiating and/or announcing TID-to-Link Mapping with a second MLD, e.g., STA MLD or AP MLD. As an example, negotiating the TID-to-Link Mapping may involve requesting the TID-to-Link Mapping for frames that correspond to TIDs. As another example, announcing the TID-to-Link Mapping may involve announcing the TID-to-Link Mapping for frames that correspond to the TIDs.

In some embodiments, an MLD (e.g., a first MLD and/or a second MLD) may request and/or announce the TID-to-Link Mapping for frames that correspond to TIDs that may be initiated (e.g., transmitted) from the MLD and/or destinated (e.g., received at) to the MLD. In some embodiments, the MLD may request and/or announce the TID-to-Link Mapping for frames that correspond to the TIDs that may be initiated primarily from the MLD, e.g., Quality of Service (QoS) Data frames that correspond to the TID transmitted by the MLD. In some embodiments, the MLD may request and/or announce the TID-to-Link Mapping for frames that correspond to the TIDs that may be destinated primarily to the MLD, e.g., QoS Data frames that correspond to the TID received by the MLD. In such embodiments, the MLD may request and/or announce the TID-to-Link Mapping for frames that correspond to the TIDs via an action frame that may be transmitted and/or received by the MLD. In some embodiments, a TID-to-Link Mapping request may be accepted, and new negotiated TID-to-Link Mapping can be used to select links for frame exchange. For example, when both UL TID 6 and DL TID 6 are mapped to a link (e.g., link2) in negotiated TID-to-Link Mapping, the first MLD and the second MLD may use another link (e.g., link1) to transmit QoS Data frames with TID 6.

An action frame that may be transmitted and/or received by an MLD is described in further detail with reference to FIG. 2.

Figure 2:
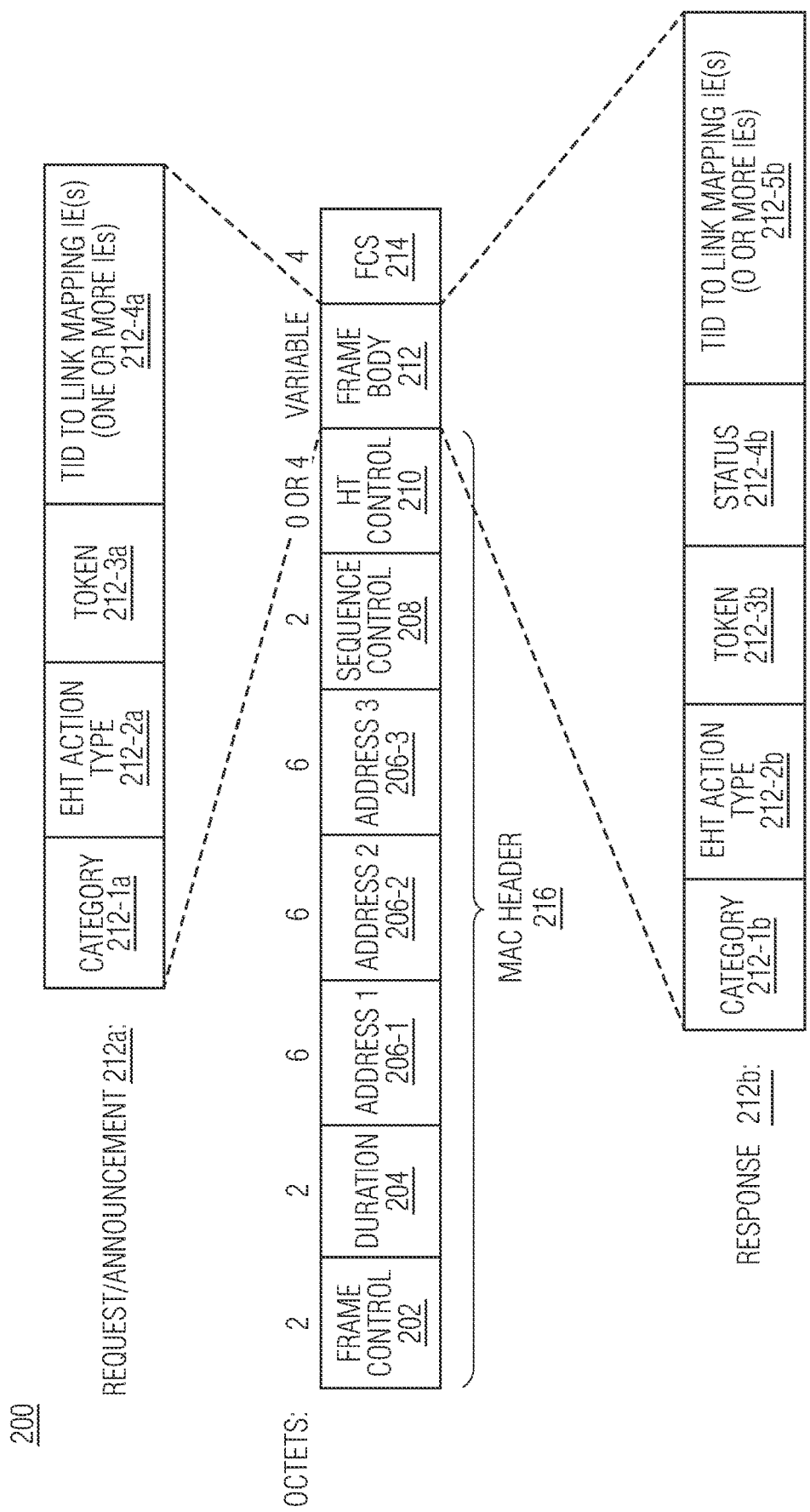
FIG. 2 depicts examples of frame bodies of an action frame in accordance with an embodiment of the invention.

FIG. 2 depicts examples of frame bodies of an action frame, 200, in accordance with an embodiment of the invention. In some embodiments, the action frame 200 may be an MLD level action frame. In one embodiment, the action frame 200 may be a TID-to-Link Mapping Request frame or a TID-to-Link Mapping Announcement frame that includes a Request frame body or an Announcement frame body (shown by Request/Announcement 212*a*), respectively. In some embodiments, information included in the TID-to-Link Mapping Announcement frame may be carried in a Beacon frame. In another embodiment, the action frame may be a TID-to-Link Mapping Response frame that includes a Response frame body (shown by Response 212*b*). In some embodiments, the action frame 200 may be transmitted and/or received by a first MLD and/or a second MLD as part of TID-to-Link Mapping.

With reference to FIG. 2, the action frame 200 is shown as including nine fields, implemented as a first field, Frame Control 202 (2 octets), a second field, Duration 204 (2 octets), a third field, Address 1 206-1 (6 octets), a fourth field, Address 2 206-2 (6 octets), a fifth field, Address 3 206-3 (6 octets), a sixth field, Sequence Control 208 (2 octets), a seventh field, High Throughput (HT) Control 210 (0 or 4 octets), an eighth field, Frame Body 212 (variable octets), and a ninth field, Frame Check Sequence (FCS) 214 (4 octets). In an embodiment, a MAC Header portion, 216, of the action frame 200 may include Frame Control 202, Duration 204, Address 1 206-1, Address 2 206-2, Address 3 206-3, Sequence Control 208, and HT Control 210.

With further reference to FIG. 2, in an embodiment, the Request frame body or the Announcement frame body (shown by Request/Announcement 212*a*) may include four subfields in Frame Body 212, implemented as a first subfield, Category 212-1*a*, a second subfield, EHT Action Type 212-2*a*, a third subfield, Token 212-3*a* (e.g., request Token), and a fourth subfield, TID-to-Link Mapping Information Element(s) (IE) 212-4*a*, which may be one or more IEs. In an embodiment, Token 212-3*a* (e.g., request Token) of the TID-to-Link Mapping Request frame may be used to match the TID-to-Link Mapping Response frame (that may be transmitted by the second MLD). As an example, Category 212-1*a* may include an EHT category, EHT Action Type 212-2*a* may include TID-to-Link Mapping information (e.g., requested TID-to-Link Mapping information) for the TID-to-Link Mapping Request frame or the TID-to-Link Mapping Announcement frame, and/or Token 212-3*a* may include a value from zero to 256. In an embodiment, the TID-to-Link Mapping information may be included in a TID-to-Link Mapping element (not shown).

With further reference to FIG. 2, in an embodiment, the Response frame body (shown by Response 212*b*) included in a TID-to-Link Mapping Response frame may include five subfields in Frame Body 212, implemented as a first subfield, Category 212-1*b*, a second subfield, EHT Action Type 212-2*b*, a third subfield, Token 212-3*b* (e.g., response Token), a fourth subfield, Status 212-4*b*, and a fifth subfield, TID-to-Link Mapping IE(s) 212-5*b*, which may be zero or more IEs. In some embodiments, the TID-to-Link Mapping Response frame may also include a negotiation result that indicates whether TID-to-Link Mapping may be accepted or rejected, a rejection reason, and/or optional Suggested TID-to-Link Mapping information. For example, when requested TID-to-Link Mapping is rejected, the optional Suggested TID-to-Link Mapping information may be included (and transmitted) in a TID-to-Link Mapping element (not shown). In an embodiment, Token 212-3*b* (e.g., response Token) of the TID-to-Link Mapping Response frame may be used to match the TID-to-Link Mapping Request frame (that may be transmitted by the first MLD). As an example, Category 212-1*b* may include an EHT category and/or EHT Action Type 212-2*b* may include TID-to-Link Mapping information (e.g., response TID-to-Link Mapping information) for the TID-to-Link Mapping Response frame. In an embodiment, the TID-to-Link Mapping information may be included in a TID-to-Link Mapping element (not shown).

In one embodiment, a frame body of a TID-to-Link Mapping Teardown frame (not shown) may include a Category and an EHT Action Type, such that the EHT Action Type may indicate a tearing down of negotiated TID-to-Link Mapping. In another embodiment, the TID-to-Link Mapping Teardown frame, the TID-to-Link Mapping Request frame, and/or the TID-to-Link Mapping Response frame may include an additional target Timing Synchronization Function (TSF) field that may indicate a future time when new TID-to-Link Mapping (includes default TID-to-Link Mapping) may be used.

Examples of TID-to-Link Mapping elements are described in further detail with reference to FIGS. 3A-3D.

Figure 3A:
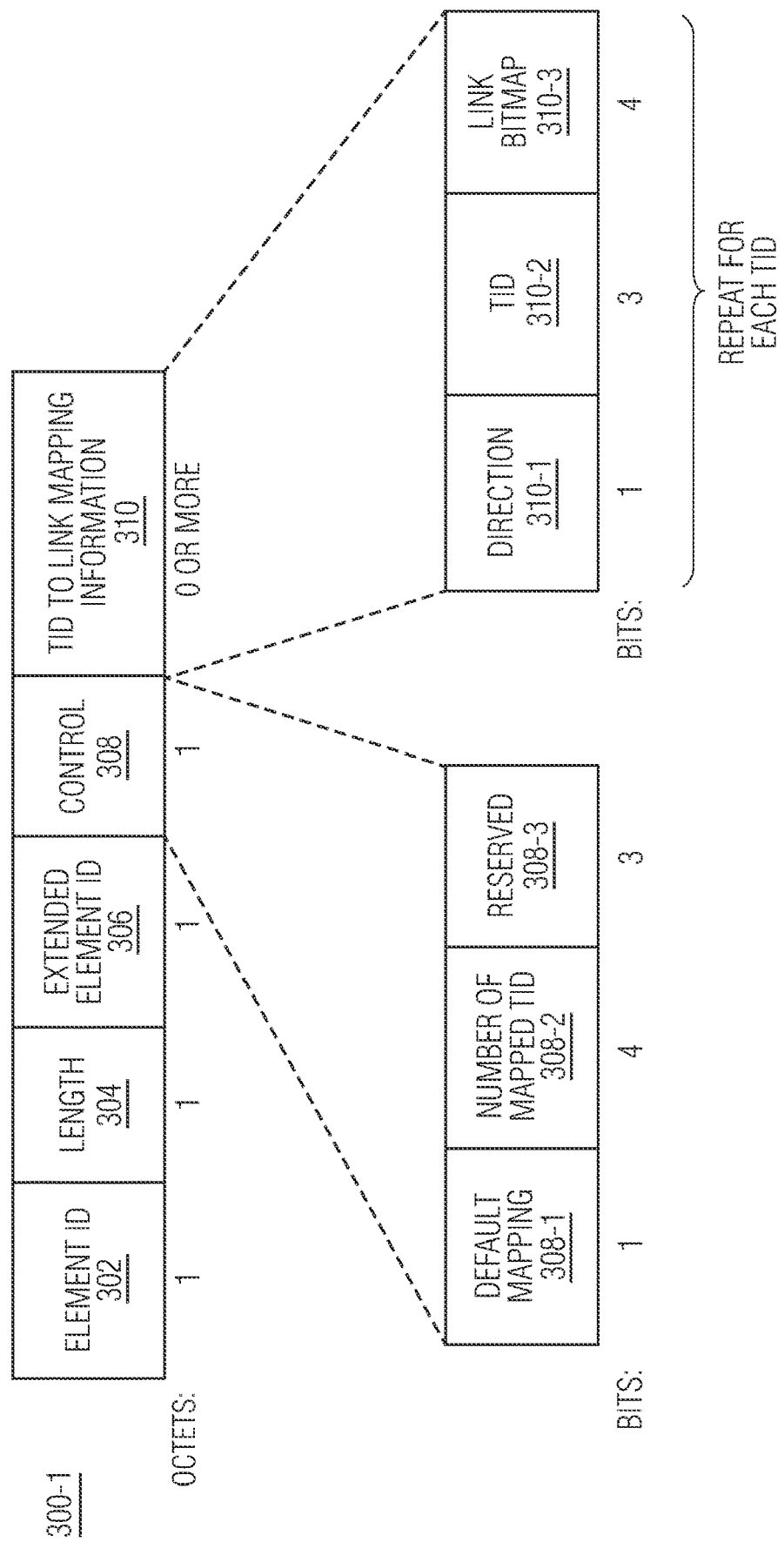
FIG. 3A depicts an example of a frame body of a Traffic Identifier (TID)-to-Link Mapping element in accordance with an embodiment of the invention.

FIG. 3A depicts an example of a frame body of a TID-to-Link Mapping element, 300-1, in accordance with an embodiment of the invention. In some embodiments, the TID-to-Link Mapping element 300-1 may include requested TID-to-Link Mapping information for the Request frame body 212*a* of the action frame 200. In some embodiments, the TID-to-Link Mapping element 300-1 may include response TID-to-Link Mapping information for the Response frame body 212*b* of the action frame 200. With reference to FIG. 3A, the frame body of the TID-to-Link Mapping element 300-1 is shown as including five fields, implemented as a first field, Element ID 302 (1 octet), a second field, Length 304 (1 octet), a third field, Extended Element ID 306 (1 octet), a fourth field, Control 308 (1 octet), and a fifth field, TID-to-Link Mapping Information 310 (0 or more octets). In an embodiment, TID-to-Link Mapping Information 310 may include TID-to-Link Mapping for a corresponding frame (e.g., TID-to-Link Mapping Request frame, TID-to-Link Mapping Announcement frame, TID-to-Link Mapping Teardown frame, and/or TID-to-Link Mapping Response frame).

With reference to FIG. 3A, in an embodiment, Control 308 of the TID-to-Link Mapping element 300-1 is shown as including three subfields, implemented as a first subfield, Default Mapping 308-1 (1-bit), a second subfield, Number of Mapped TID 308-2 (4-bits), and a third subfield, Reserved 308-3 (3-bits). In an embodiment, TID-to-Link Mapping Information 310 of the TID-to-Link Mapping element 300-1 is shown as including three subfields, implemented as a first subfield, Direction 310-1 (1-bit), a second subfield, TID 310-2 (3-bits), and a third subfield, Link Bitmap 310-3 (4-bits). In such an embodiment, the three subfields of TID-to-Link Mapping Information 310 of the TID-to-Link Mapping element 300-1 may be repeated for each TID.

With further reference to FIG. 3A, as an example, Default Mapping 308-1 of the TID-to-Link Mapping element 300-1 may indicate whether mapping of a TID mapped to a corresponding link may be requested, suggested, or announced. As another example, Number of Mapped TID 308-2 of the TID-to-Link Mapping element 300-1 may indicate a number of mapped TIDs included in TID-to-Link Mapping Information 310. In one embodiment, DL TIDs and UL TIDs for a corresponding link may be separately indicated for the TID-to-Link Mapping element 300-1, such that the DL TIDs and the UL TIDs may be indicated by Direction 310-1. In another embodiment, the DL TIDs and the UL TIDs may be mapped to a same corresponding link, such that Direction 310-1 may not be needed. In addition, although Link Bitmap 310-3 may be 4-bits, the number of bits included in Link Bitmap 310-3 may be changed via an indication in another field or subfield (e.g., Control 308). In some embodiments, a padding field (not shown) may be needed in TID-to-Link Mapping Information 310 when there are multiple octets (e.g., more than one).

Figure 3B:
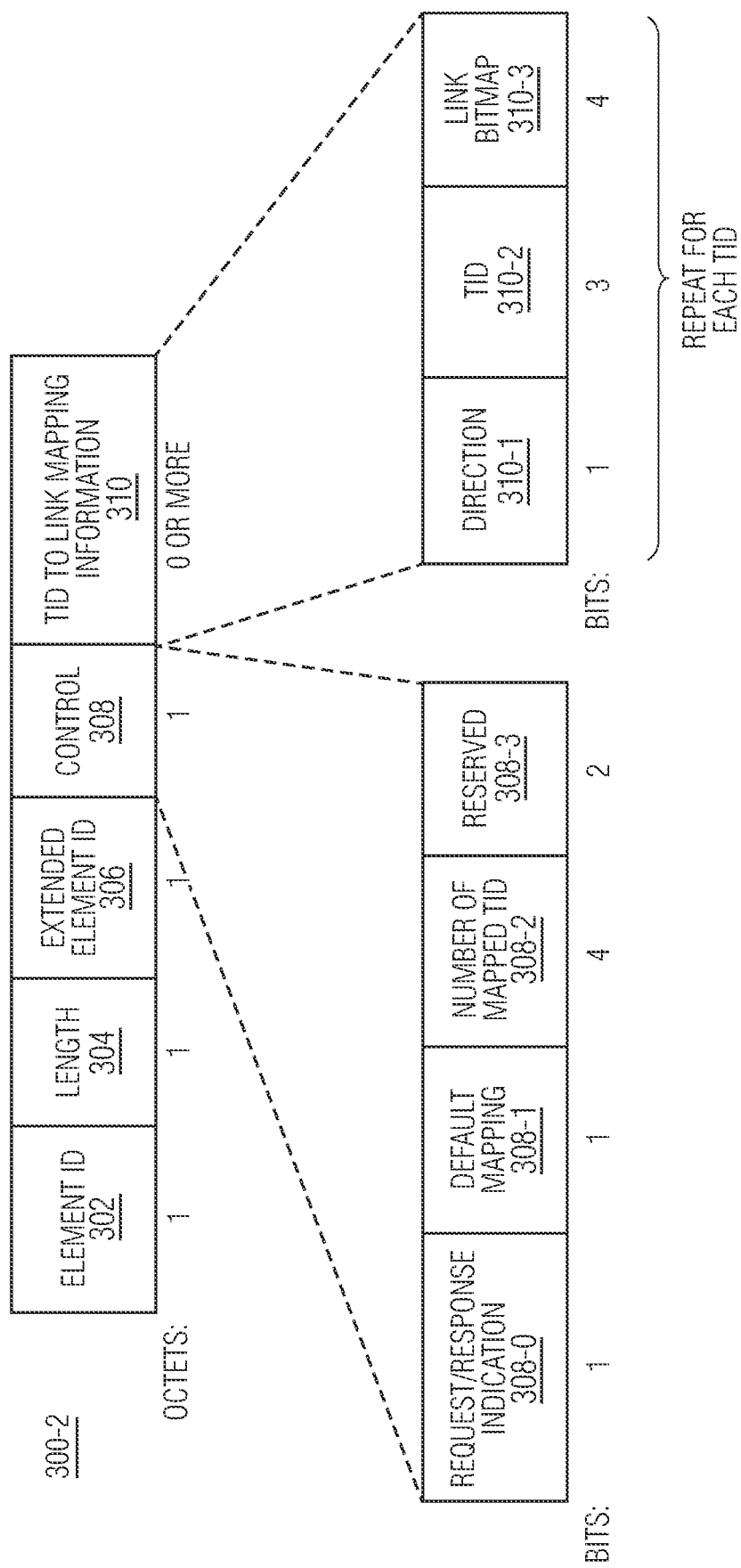
FIG. 3B depicts another example of a frame body of a TID-to-Link Mapping element in accordance with an embodiment of the invention.

FIG. 3B depicts another example of a frame body of a TID-to-Link Mapping element, 300-2, in accordance with an embodiment of the invention. In an embodiment, a single TID-to-Link Mapping frame may be represented by using the TID-to-Link Mapping element 300-2. In some embodiments, the TID-to-Link Mapping element 300-2 may include requested TID-to-Link Mapping information for the Request frame body 212*a* of the action frame 200. In some embodiments, the TID-to-Link Mapping element 300-2 may include response TID-to-Link Mapping information for the Response frame body 212*b* of the action frame 200. With reference to FIG. 3B, the frame body of the TID-to-Link Mapping element 300-2 is shown as including five fields, implemented as a first field, Element ID 302 (1 octet), a second field, Length 304 (1 octet), a third field, Extended Element ID 306 (1 octet), a fourth field, Control 308 (1 octet), and a fifth field, TID-to-Link Mapping Information 310 (0 or more octets). In an embodiment, TID-to-Link Mapping Information 310 may include TID-to-Link Mapping for a corresponding frame (e.g., TID-to-Link Mapping Request frame, TID-to-Link Mapping Announcement frame, and/or TID-to-Link Mapping Response frame). In another embodiment, the TID-to-Link Mapping element 300-2 may include a teardown indication (not shown) of the TID-to-Link Mapping for the Response frame body 212*b* of the action frame 200, such that TID-to-Link Mapping Information 310 may not be needed.

With reference to FIG. 3B, in an embodiment, Control 308 of the TID-to-Link Mapping element 300-2 is shown as including four subfields, implemented as a zero subfield, Request/Response Indication 308-0 (1-bit), a first subfield, Default Mapping 308-1 (1-bit), a second subfield, Number of Mapped TID 308-2 (4-bits), and a third subfield, Reserved 308-3 (2-bits). In an embodiment, TID-to-Link Mapping Information 310 of the TID-to-Link Mapping element 300-2 is shown as including three subfields, implemented as a first subfield, Direction 310-1 (1-bit), a second subfield, TID 310-2 (3-bits), and a third subfield, Link Bitmap 310-3 (4-bits). In such an embodiment, the three subfields of TID-to-Link Mapping Information 310 of the TID-to-Link Mapping element 300-2 may be repeated for each TID.

With further reference to FIG. 3B, as an example, Request/Response Indication 308-0 of the TID-to-Link Mapping element 300-2 may indicate whether mapping of a TID mapped to a corresponding link may be a request or a response. As another example, Number of Mapped TID 308-2 of the TID-to-Link Mapping element 300-2 may indicate a number of mapped TIDs included in TID-to-Link Mapping Information 310. In one embodiment, DL TIDs and UL TIDs for a corresponding link may be separately indicated for the TID-to-Link Mapping element 300-2, such that the DL TIDs and the UL TIDs may be indicated by Direction 310-1. In another embodiment, the DL TIDs and the UL TIDs may be mapped to a same corresponding link, such that Direction 310-1 may not be needed. In addition, although Link Bitmap 310-3 may be 4-bits, the number of bits included in Link Bitmap 310-3 may be changed via an indication in another field or subfield (e.g., Control 308). In some embodiments, a padding field (not shown) may be needed in TID-to-Link Mapping Information 310 when there are multiple octets (e.g., more than one).

Figure 3C:
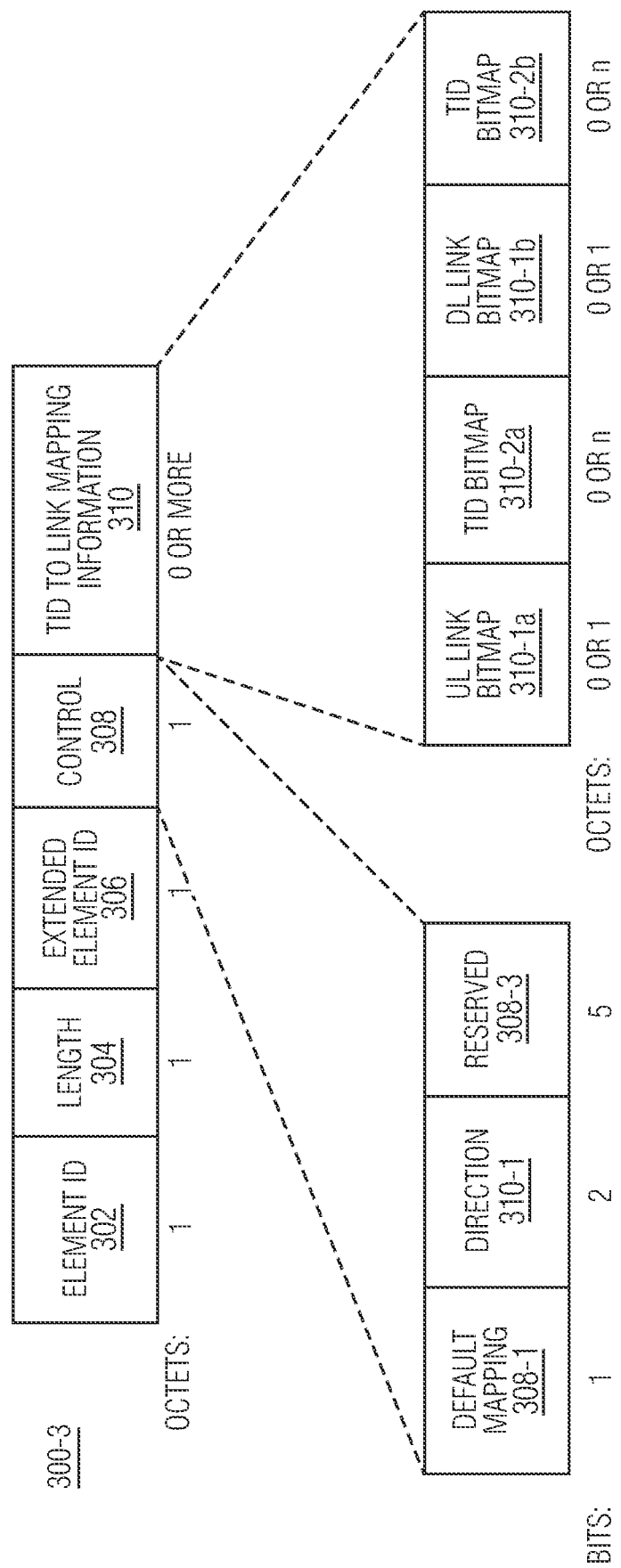
FIG. 3C depicts another example of a frame body of a TID-to-Link Mapping element in accordance with an embodiment of the invention.

FIG. 3C depicts another example of a frame body of a TID-to-Link Mapping element, 300-3, in accordance with an embodiment of the invention. In some embodiments, the TID-to-Link Mapping element 300-3 may include requested TID-to-Link Mapping information for the Request frame body 212a of the action frame 200. In some embodiments, the TID-to-Link Mapping element 300-3 may include response TID-to-Link Mapping information for the Response frame body 212b of the action frame 200. With reference to FIG. 3C, the frame body of the TID-to-Link Mapping element 300-3 is shown as including five fields, implemented as a first field, Element ID 302 (1 octet), a second field, Length 304 (1 octet), a third field, Extended Element ID 306 (1 octet), a fourth field, Control 308 (1 octet), and a fifth field, TID-to-Link Mapping Information 310 (0 or more octets). In an embodiment, TID-to-Link Mapping Information 310 may include TID-to-Link Mapping for a corresponding frame (e.g., TID-to-Link Mapping Request frame, TID-to-Link Mapping Announcement frame, TID-to-Link Mapping Teardown frame, and/or TID-to-Link Mapping Response frame). In another embodiment, the TID-to-Link Mapping element 300-3 may include a teardown indication (not shown) of the TID-to-Link Mapping for the Response frame body 212b of the action frame 200, such that TID-to-Link Mapping Information 310 may not be needed. In another embodiment, Control 308 of the TID-to-Link Mapping element 300-3 may include an indication of Request, Response, and/or Teardown so that different values of EHT Action Type may not be used to indicate a TID-to-Link Mapping request, TID-to-Link Mapping response, and/or TID-to-Link Mapping teardown.

With reference to FIG. 3C, in an embodiment, Control 308 of the TID-to-Link Mapping element 300-3 is shown as including three subfields, implemented as a first subfield, Default Mapping 308-1 (1-bit), a second subfield, Direction 310-1 (2-bits), and a third subfield, Reserved 308-3 (5-bits). In an embodiment, TID-to-Link Mapping Information 310 of the TID-to-Link Mapping element 300-3 is shown as including four subfields, implemented as a first subfield, UL Link Bitmap 310-1a (0 or 1 octet where an ith bit with value 1 indicates that mapping of TID 0 to 7 to an ith link is included in TID Bitmap 310-2a), a second subfield, TID Bitmap 310-2a (0 or n octets (n may be an integer greater than zero) where each octet indicates mapping of TID 0 to 7 to a link), a third subfield, DL Link Bitmap 310-1b (0 or 1 octet where an ith bit with value 1 indicates that mapping of TID 0 to 7 to an ith link is included in TID Bitmap 310-2b), and a fourth subfield, TID Bitmap 310-2b (0 or n octets where each octet indicates mapping of TID 0 to 7 to a link). In such an embodiment, TID Bitmap 310-2a may correspond to UL Link Bitmap 310-1a and TID Bitmap 310-2b may correspond to DL Link Bitmap 310-1b.

With further reference to FIG. 3C, in one embodiment, TID Bitmap 310-2a may be zero or may repeat for a number of links for which a related bit in UL Link Bitmap 310-1a is not zero, such that each octet (e.g., 8-bits) may be a TID bitmap of a link, such that each bit may correspond to a TID from 0 to 7. In such an embodiment, TID Bitmap 310-2b may be zero or may repeat for a number of links for which a related bit in DL Link Bitmap 310-1b is not zero, such that each octet (e.g., 8-bits) may be a TID bitmap of a link.

With further reference to FIG. 3C, as an example, Default Mapping 308-1 of the TID-to-Link Mapping element 300-3 may indicate whether mapping of a TID mapped to a corresponding link may be requested, suggested, or announced. In one embodiment, DL TIDs and UL TIDs for a corresponding link may be separately indicated for the TID-to-Link Mapping element 300-3, such that the DL TIDs and the UL TIDs may be indicated by Direction 310-1. In some embodiments, a padding field (not shown) may be needed in TID-to-Link Mapping Information 310 when there are multiple octets (e.g., more than one).

Figure 3D:
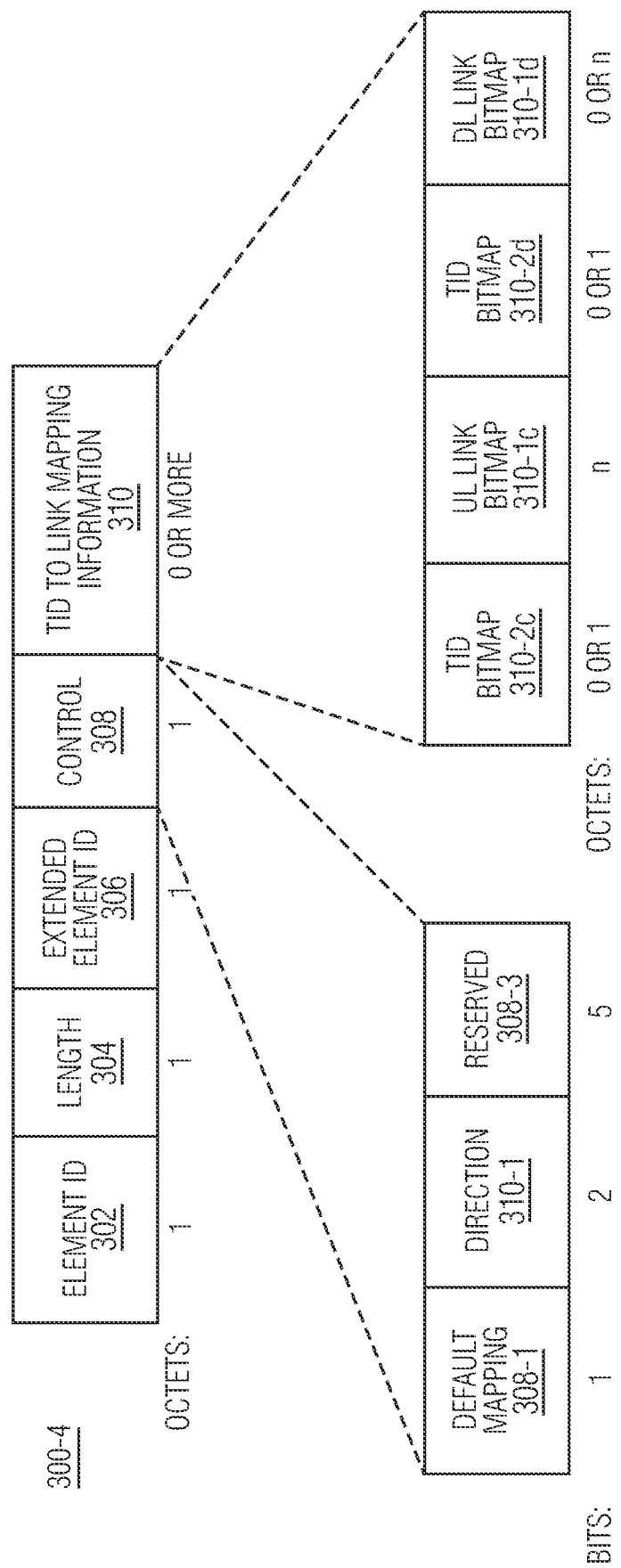
FIG. 3D depicts another example of a frame body of a TID-to-Link Mapping element in accordance with an embodiment of the invention.

FIG. 3D depicts another example of a frame body of a TID-to-Link Mapping element, 300-4, in accordance with an embodiment of the invention. In some embodiments, the TID-to-Link Mapping element 300-4 may include requested TID-to-Link Mapping information for the Request frame body 212a of the action frame 200. In some embodiments, the TID-to-Link Mapping element 300-4 may include response TID-to-Link Mapping information for the Response frame body 212b of the action frame 200. With reference to FIG. 3D, the frame body of the TID-to-Link Mapping element 300-4 is shown as including five fields, implemented as a first field, Element ID 302 (1 octet), a second field, Length 304 (1 octet), a third field, Extended Element ID 306 (1 octet), a fourth field, Control 308 (1 octet), and a fifth field, TID-to-Link Mapping Information 310 (0 or more octets). In an embodiment, TID-to-Link Mapping Information 310 may include TID-to-Link Mapping for a corresponding frame (e.g., TID-to-Link Mapping Request frame, TID-to-Link Mapping Announcement frame, and/or TID-to-Link Mapping Response frame). In another embodiment, the TID-to-Link Mapping element 300-4 may include a teardown indication (not shown) of the TID-to-Link Mapping for the Response frame body 212b of the action frame 200, such that TID-to-Link Mapping Information 310 may not be needed. In another embodiment, Control 308 of the TID-to-Link Mapping element 300-3 may include an indication of Request, Response, and/or Teardown so that different values of EHT Action Type may not be used to indicate a TID-to-Link Mapping request, TID-to-Link Mapping response, and/or TID-to-Link Mapping teardown.

With reference to FIG. 3D, in an embodiment, Control 308 of the TID-to-Link Mapping element 300-4 is shown as including three subfields, implemented as a first subfield, Default Mapping 308-1 (1-bit), a second subfield, Direction 310-1 (2-bits), and a third subfield, Reserved 308-3 (5-bits). In an embodiment, TID-to-Link Mapping Information 310 of the TID-to-Link Mapping element 300-4 is shown as including four subfields, implemented as a first subfield, TID Bitmap 310-2c (0 or 1 octets where each bit indicates a TID and where if one bit has value 1, the mapping of related TID to links are announced in UL Link Bitmap 310-1c), a second subfield, UL Link Bitmap 310-1c (n octets where each octet is mapping of a UL TID to links and if an ith bit has value 1, TID maps to an ith link), a third subfield, TID Bitmap 310-2d (0 or 1 octet where each bit indicates a TID and where if one bit has value 1, mapping of related TID to links are announced in TID Bitmap 310-2d), and a fourth subfield, DL Link Bitmap 310-1d (0 or n octets where each octet is mapping of a DL TID to links and if an ith bit has value 1, TID is mapping to an ith link).

With further reference to FIG. 3D, in one embodiment, UL Link Bitmap 310-1c may be zero or may repeat for a number of links for which a related bit in UL Link Bitmap 310-1c is not zero, such that each octet (e.g., 8-bits or another number of bits) may be a link bitmap of a TID, such that an ith bit may indicate whether the TID may be mapped to an ith link. In such an embodiment, DL Link Bitmap 310-1d may be zero or may repeat for a number of links for which a related bit in DL Link Bitmap 310-1d is not zero, such that each octet (e.g., 8-bits or another number of bits) may be a link bitmap of a TID, such that an ith bit may indicate whether the TID may be mapped to an ith link.

With further reference to FIG. 3D, as an example, Default Mapping 308-1 of the TID-to-Link Mapping element 300-4 may indicate whether mapping of a TID mapped to a corresponding link may be requested, suggested, or announced. In one embodiment, DL TIDs and UL TIDs for a corresponding link may be separately indicated for the TID-to-Link Mapping element 300-4, such that the DL TIDs and the UL TIDs may be indicated by Direction 310-1. In some embodiments, a padding field (not shown) may be needed in TID-to-Link Mapping Information 310 when there are multiple octets (e.g., more than one).

In some embodiments, a frame (e.g., action frame 200) may be transmitted and/or received by an MLD (e.g., first MLD and/or second MLD) to map a TID (or TIDs) to at least one of multiple links (e.g., two or more links) associated with the MLD. In one embodiment, a first MLD (e.g., AP MLD 104) may connect to a second MLD (e.g., STA MLD 108) via multiple links (e.g., at least two links) and may map the TID to at least one of the multiple links associated with the first MLD and the second MLD. In such an embodiment, the first MLD may transmit the frames that correspond to the TID on at least one of the multiple links according to the mapping by the first MLD, and receive from the second MLD, subsequent frames on at least one of the multiple links according to the mapping by the first MLD.

In some embodiments, mapping the TID to at least one of the multiple links associated with the first MLD and the second MLD may involve the first MLD negotiating TID-to-Link Mapping with the second MLD. In such an embodiment, negotiating the TID-to-Link Mapping may involve the first MLD transmitting a TID-to-Link Mapping Request frame (e.g., action frame 200 with Request frame body 212a) that includes a request Token (e.g., Token 212-3a) and requested TID-to-Link Mapping information to the second MLD. In such an embodiment, in response to the transmitted TID-to-Link Mapping Request frame, the first MLD may receive a TID-to-Link Mapping Response frame (e.g., action frame 200 with Response frame body 212b) that includes a response Token (e.g., Token 212-3b) and a negotiation result from the second MLD. In one embodiment, the negotiation result included in the TID-to-Link Mapping Response frame may indicate that the TID-to-Link Mapping of the TID-to-Link Mapping Request frame may be accepted. In another embodiment, the negotiation result included in the TID-to-Link Mapping Response frame may indicate that the TID-to-Link Mapping of the TID-to-Link Mapping Request frame may be rejected and may include a rejection reason. In such an embodiment, the TID-to-Link Mapping Response frame that indicates that the TID-to-Link Mapping of the TID-to-Link Mapping Request frame may be rejected may include Suggested TID-to-Link Mapping information.

In some embodiments, a recipient of a TID-to-Link Mapping Request frame (e.g., second MLD) may decide a negotiation result (e.g., whether the request may be accepted or not) except for when a transmitter of the TID-to-Link Mapping Request frame (e.g., first MLD) uses a TID-to-Link Mapping teardown to resume default TID-to-Link Mapping. As an example, TID-to-Link Mapping teardown may involve an indication of tearing down negotiated TID-to-Link Mapping. In such an embodiment, negotiation may not be needed when the first MLD uses the TID-to-Link Mapping teardown to resume default TID-to-Link Mapping. In another embodiment, a TID-to-Link Mapping Teardown frame may be used for a notification. In another embodiment, the recipient of the TID-to-Link Mapping Request frame may decide the negotiation result except for when the TID-to-Link Mapping Request frame requests to map a TID to a smaller number of links. In such an embodiment, the TID-to-Link Mapping of the TID-to-Link Mapping Request frame may be accepted when the TID-to-Link Mapping Request frame requests to map a TID to a smaller number of links (e.g., the TID-to-Link Mapping Request frame may change the TID-to-Link Mapping from "TID 7 mapped to link1, link2, link 3" to "TID 7 mapped to link1, link2"). In another embodiment, the recipient of the TID-to-Link Mapping Request frame may decide the negotiation result except for when the TID-to-Link Mapping Request frame requests to map a TID to a larger number of links. In such an embodiment, the TID-to-Link Mapping of the TID-to-Link Mapping Request frame may be accepted when the TID-to-Link Mapping Request frame requests to map a TID to a larger number of links (e.g., the TID-to-Link Mapping Request frame may change the TID-to-Link Mapping from "TID 7 mapped to link1, link2" to "TID 7 mapped to link1, link2, link 3").

In some embodiments, mapping a TID to at least one of two links associated with a first MLD and a second MLD may involve the first MLD transmitting a TID-to-Link Mapping Request frame (e.g., action frame 200 with Request frame body 212a) that requests default TID-to-Link Mapping to the second MLD. In such embodiment, the first MLD may receive, from the second MLD, a TID-to-Link Mapping Response frame (e.g., action frame 200 with Response frame body 212b) that indicates that the default TID-to-Link Mapping of the TID-to-Link Mapping Request frame may be accepted.

In some embodiments, a second MLD (e.g., non-AP MLD) may indicate, e.g., in an ML element or an HE Capabilities element, whether the second MLD may always accept TID-to-Link mapping announced by a first MLD (e.g., AP MLD). In some embodiments, the first MLD may announce TID-to-Link Mapping via TID-to-Link Mapping Announcement frames transmitted to the non-AP MLDs that may be announcing acceptance of the TID-to-Link Mapping of the TID-to-Link Mapping Announcement frames transmitted by the first MLD. In some embodiments, once a non-first MLD (e.g., second MLD) indicates acceptance of the TID-to-Link Mapping of the TID-to-Link Mapping Announcement frame in the ML element, the second MLD may implement the TID-to-Link Mapping of the TID-to-Link Mapping Announcement frame. In some embodiments, the TID-to-Link Mapping Announcement frame may have the same format as a TID-to-Link Mapping Request frame (except that instead of indicating a "Request", the TID-to-Link Mapping Announcement frame indicates an "Announcement"). In one embodiment, an "Announcement" Indication may be in Control 308. In another embodiment, the "Announcement" Indication may be in EHT Action Type 212-2a.

In some embodiments, a second MLD may support restricted Target Wake Time (TWT) and may always accept TID-to-Link Mapping of a TID-to-Link Mapping Announcement frame from a first MLD. In some embodiments, the second MLD that supports restricted TWT may not need to indicate the acceptance of the TID-to-Link Mapping of the TID-to-Link Mapping Announcement frame via a multi-link (ML) element transmitted to the first MLD.

In some embodiments, after a first MLD (e.g., AP MLD) broadcasts (e.g., transmits) TID-to-Link Mapping via a TID-to-Link Mapping Announcement frame, the first MLD may negotiate the TID-to-Link Mapping with a second MLD(s) that may not indicate acceptance of the TID-to-Link Mapping of the TID-to-Link Mapping Announcement frame. For example, after broadcasting the TID-to-Link Mapping Announcement frame, the first MLD may then negotiate the TID-to-Link Mapping with the second MLD(s) which may not indicate the acceptance of the TID-to-Link Mapping of the TID-to-Link Mapping Announcement frame during association, such that the first MLD may transmit a TID-to-Link Mapping Request frame (e.g., action frame 200 with Request frame body 212a) that includes a request Token (e.g., Token 212-3a) and requested TID-to-Link Mapping information to the second MLD and receive (at the first MLD) a TID-to-Link Mapping Response frame (e.g., action frame 200 with Response frame body 212b) that includes a response Token (e.g., Token 212-3b) and a negotiation result from the second MLD. In such an example, the negotiation result from the second MLD may indicate that the TID-to-Link Mapping of the TID-to-Link Mapping Request frame may be accepted.

In some embodiments, a second MLD may be an STA MLD or an AP MLD and after a DL TID is mapped to a new link where TIDs have not been mapped, an STA of the STA MLD in the new link may be in power save mode and in doze state after a map negotiation or a map indication. As an example, when the STA MLD or the AP MLD successfully negotiates TID-to-Link Mapping to the new link where the TIDs have not been mapped, the STA of the STA MLD in the new link may be in power save mode and in doze state after the map negotiation or the map indication.

In some embodiments, link disablement may be performed via TID-to-Link Mapping, e.g., mapping a TID to at least one of two links associated with a first MLD and a second MLD. In one embodiment, link disablement via the TID-to-Link Mapping (e.g., when no TIDs are to be mapped to a disabled link) may performed by the first MLD (e.g., non-AP MLD) by a TID-to-Link Mapping negotiation on links with at least one mapped TID, such that the TID-to-Link Mapping negotiation may always be accepted by the second MLD (e.g., AP MLD). In another embodiment, link disablement via the TID-to-Link Mapping (e.g., when no TIDs are to be mapped to a disabled link) may be performed by the first MLD (e.g., AP MLD) by a TID-to-Link Mapping announcement on links with at least one mapped TID, such that the TID-to-Link Mapping announcement may be accepted by the second MLD (e.g., non-AP MLD).

An example of MLDs in a multi-link communications system with link disablement are described in further detail with reference to FIG. 4.

Figure 4:
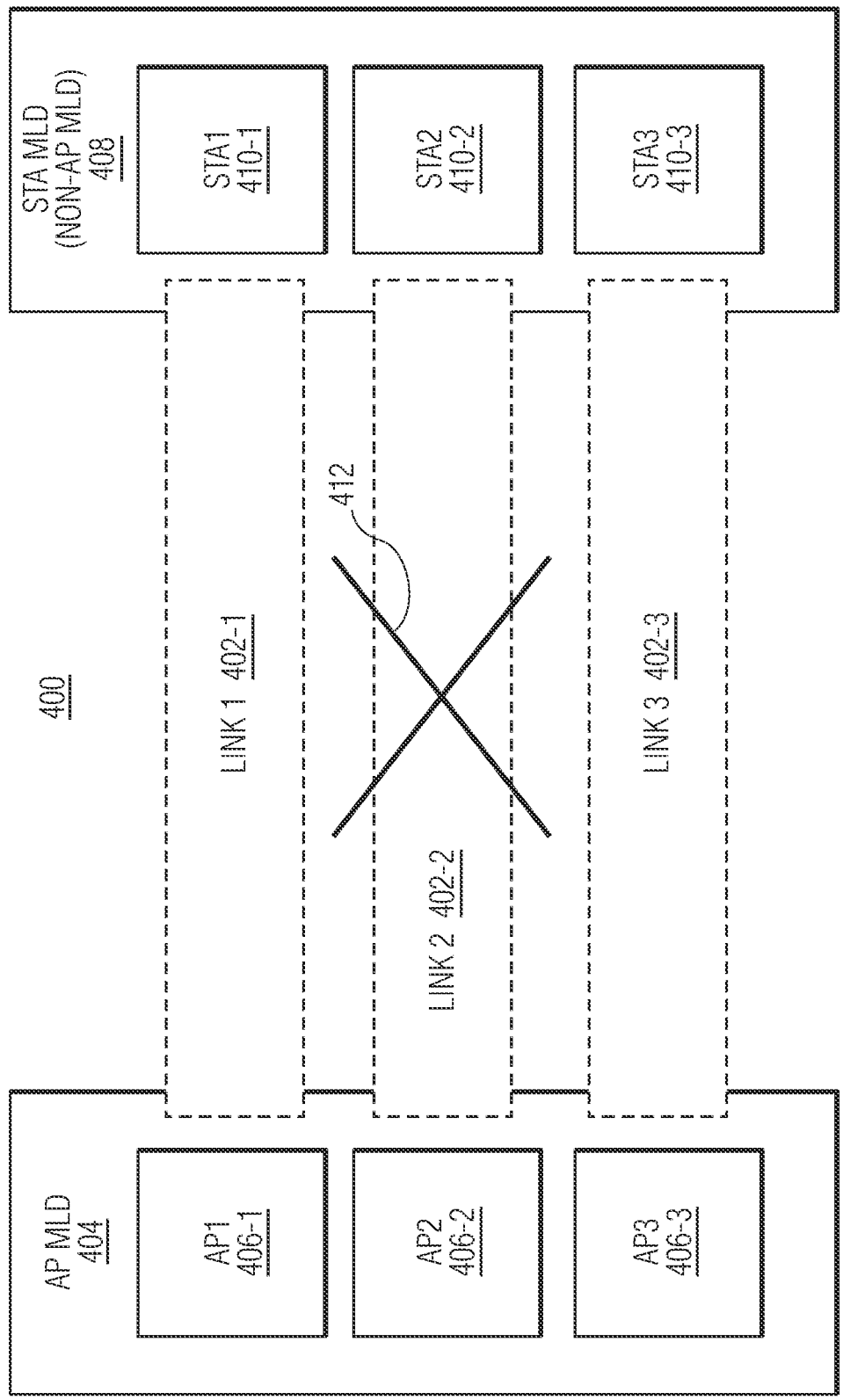
FIG. 4 depicts a multi-link communications system with link disablement in accordance with an embodiment of the invention.

FIG. 4 depicts a multi-link communications system, 400, with link disablement in accordance with an embodiment of the invention. In particular, FIG. 4 is shown as including an AP MLD (e.g., first MLD) and an STA MLD (non-AP MLD) (e.g., second MLD), implemented as AP MLD 404 and STA MLD 408, respectively. With reference to FIG. 4, the AP MLD 404 is shown as including three APs, implemented as AP1 406-1, AP2 406-2, and AP3 406-3, and the STA MLD 408 is shown as including three STAs, implemented as STA1 410-1, STA2 410-2, and STA3 410-3. In an embodiment, the APs (e.g., AP1 406-1, AP2 406-2, and AP3 406-3) of the AP MLD 404 and the STAs (e.g., STA1 410-1, STA2 410-2, and STA3 410-3) of the STA MLD 408 may communicate via a corresponding communication link (e.g., link 1 402-1, link 2 402-2, and link 3 402-3). For example, AP1 406-1 may communicate with STA1 410-1 via link 1 402-1, AP2 406-2 may communicate with STA2 410-2 via link 2 402-2, and AP3 406-3 may communicate with STA3 410-3 via link 3 402-3. In an embodiment, an MLD (e.g., AP MLD 404 or STA MLD 408) may perform link disablement via TID-to-Link Mapping, such that link 2 402-2 may be disabled (shown by link disablement 412). Although FIG. 4 shows link 2 402-2 as being a disabled link, the disabled link may not be limited to link 2 402-2 and may be another link(s) (e.g., link 1 402-1 and/or link 3 402-3).

Figure 5:
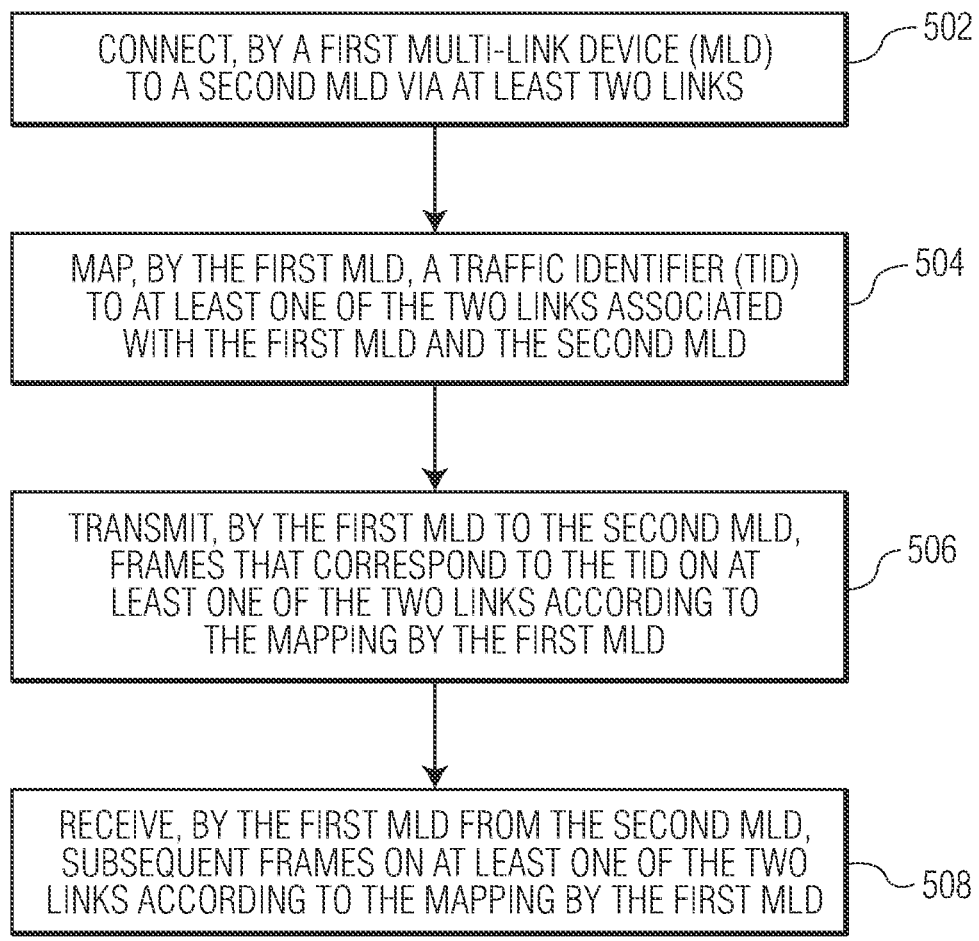
FIG. 5 illustrates a flow diagram of a technique for wireless communications in accordance with an embodiment of the invention.

FIG. 5 illustrates a flow diagram of a technique for wireless communications in accordance with an embodiment of the invention. At block 502, a first MLD may connect to a second MLD via at least two links. At block 504, the first MLD may map a TID to at least one of the two links associated with the first MLD and the second MLD. At block 506, the first MLD may transmit to the second MLD, frames that correspond to the TID on at least one of the two links according to the mapping by the first MLD. At block 508, the first MLD may receive from the second MLD, subsequent frames on at least one of the two links according to the mapping by the first MLD.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:
   connecting, by a first multi-link device (MLD) to a second MLD via at least two links and via an association process between the first MLD and second MLD;
   mapping, by the first MLD, a Traffic Identifier (TID) to at least one of the two links associated with the first MLD and the second MLD in response to a TID-to-Link Mapping Request frame transmitted by the first MLD and received by the second MLD and a TID-to-Link Mapping Response frame transmitted by the second MLD and received by the first MLD, wherein the TID-to-Link Mapping Request frame and TID-to-Link Mapping Response frame are exchanged after the second MLD does not accept a TID-to-link mapping in a TID-Link Mapping Response to a TID-to-Link Mapping Announcement frame broadcasted, by the first MLD, during the association process between the first MLD and second MLD, wherein the mapping is based on a TID-to-link mapping sent in the TID-to-Link Mapping Request frame;
   transmitting, by the first MLD to the second MLD, frames that correspond to the TID on at least one of the two links according to the mapping by the first MLD; and
   receiving, by the first MLD from the second MLD, subsequent frames on at least one of the two links according to the mapping by the first MLD.

2. The method of claim 1, wherein mapping the TID to at least one of the two links includes:
   negotiating, by the first MLD, TID-to-Link Mapping with the second MLD, wherein negotiating the TID-to-Link Mapping with the second MLD includes:
   transmitting, by the first MLD to the second MLD, the TID-to-Link Mapping Request frame that includes a request Token and requested TID-to-Link Mapping information; and
   receiving, by the first MLD from the second MLD, the TID-to-Link Mapping Response frame that includes a response Token and a negotiation result.

3. The method of claim 2, wherein the method involves matching the request Token of the TID-to-Link Mapping Request frame to the TID-to-Link Mapping Response frame transmitted by the second MLD.

4. The method of claim 2, wherein at least one of the TID-to-Link Mapping Request frame and the TID-to-Link Mapping Response frame includes a TID-to-Link Mapping element.

5. The method of claim 4, wherein the TID-to-Link Mapping element includes a TID-to-Link Mapping Information field with an up-link (UL) Link Bitmap subfield, a down-link (DL) Link Bitmap subfield, and corresponding TID Bitmap subfields for the UL Link Bitmap subfield and the DL Link Bitmap subfield.

6. The method of claim 2, wherein the negotiation result included in the TID-to-Link Mapping Response frame indicates that the TID-to-Link Mapping is accepted.

7. The method of claim 2, wherein the negotiation result included in the TID-to-Link Mapping Response frame indicates that the TID-to-Link Mapping is rejected and includes a rejection reason.

8. The method of claim 7, wherein the TID-to-Link Mapping Response frame that indicates that the TID-to-Link Mapping is rejected includes Suggested TID-to-Link Mapping information.

9. The method of claim 1, wherein mapping the TID to at least one of the two links includes the first MLD using a TID-to-Link Mapping teardown to resume default TID-to-Link Mapping.

10. The method of claim 9, wherein the default TID-to-Link Mapping is accepted when the first MLD uses the TID-to-Link Mapping teardown to resume the default TID-to-Link Mapping.

11. The method of claim 1, wherein mapping the TID to at least one of the two links includes:
    transmitting, by the first MLD to the second MLD, the TID-to-Link Mapping Request frame that requests default TID-to-Link Mapping; and
    receiving, by the first MLD from the second MLD, the TID-to-Link Mapping Response frame that indicates that the default TID-to-Link Mapping is accepted.

12. The method of claim 1, wherein mapping the TID to at least one of the two links includes:
    announcing, by the first MLD, TID-to-Link Mapping with the second MLD, wherein announcing the TID-to-Link Mapping with the second MLD includes:
    transmitting, by the first MLD to the second MLD, the TID-to-Link Mapping Announcement frame; and
    receiving, by the first MLD from the second MLD, an indication of an announcement result.

13. The method of claim 12, wherein the second MLD is a non-Access Point (non-AP) MLD that supports restricted Target Wake Time (TWT) and the indication of the announcement result accepts the TID-to-Link Mapping at non-AP stations (STAs) of the non-AP MLD that support the announced TID-to-Link Mapping.

14. The method of claim 12, wherein the second MLD is a low latency non-AP MLD and the indication of the announcement result accepts the TID-to-Link Mapping where a first set of links is dedicated to a first set of traffic types.

15. The method of claim 1, wherein mapping the TID to at least one of the two links includes:
    announcing, by the first MLD, TID-to-Link Mapping with the second MLD via the TID-to-Link Mapping Announcement frame, wherein the second MLD does not indicate acceptance of the TID-to-Link Mapping from the first MLD;
    negotiating, by the first MLD, the TID-to-Link Mapping with the second MLD that does not indicate acceptance of the TID-to-Link Mapping, wherein negotiating the TID-to-Link Mapping with the second MLD includes:
    transmitting, by the first MLD to the second MLD, the TID-to-Link Mapping Request frame that includes a request Token and requested TID-to-Link Mapping information; and
    receiving, by the first MLD from the second MLD, the TID-to-Link Mapping Response frame that includes a response Token and a negotiation result.

16. The method of claim 15, wherein the TID-to-Link Mapping Announcement frame is a Beacon frame.

17. The method of claim 1, wherein the method involves performing link disablement by mapping the TID to at least one of the two links associated with the first MLD and the second MLD.

18. The method of claim 16, wherein link disablement via the TID-to-Link Mapping is performed by the first MLD by at least one of a TID-to-Link Mapping negotiation and a TID-to-Link Mapping announcement on links with at least one mapped TID, and wherein at least one of the TID-to-Link Mapping negotiation and the TID-to-Link Mapping announcement is accepted by the second MLD.

19. The method of claim 1, wherein the second MLD is a STA MLD and after a DL TID is mapped to a new link where TIDs have not been mapped, a STA of the STA MLD in the new link is in power save mode and in doze state after at least one of a map negotiation and a map indication.

20. A first multi-link device (MLD), the first MLD comprising:
a processor configured to:
connect to a second MLD via at least two links via an association process between the first MLD and second MLD;
map a Traffic Identifier (TID) to at least one of the two links associated with the first MLD and the second MLD in response to a TID-to-Link Mapping Request frame transmitted by the first MLD and received by the second MLD and TID-to-Link Mapping Response frame transmitted by the second MLD and received by the first MLD,
wherein the TID-to-Link Mapping Request frame and TID-to-Link Mapping Response frame are exchanged after the second MLD does not accept a TID-to-link mapping in a TID-Link Mapping Response to a TID-to-Link Mapping Announcement frame broadcasted, by the first MLD, during the association process between the first MLD and second MLD, wherein the mapping is in response to a TID-to-link mapping sent in the TID-to-Link Mapping Request frame;
transmit, to the second MLD, frames that correspond to the TID on at least one of the two links according to the mapping by the first MLD; and
receive subsequent frames on at least one of the two links according to the mapping by the first MLD from the second MLD.

* * * * *